(12) United States Patent
Wang et al.

(10) Patent No.: US 7,755,716 B2
(45) Date of Patent: Jul. 13, 2010

(54) LIQUID CRYSTAL DISPLAY

(75) Inventors: Chun-Chieh Wang, Hsinchu (TW); Yu-Hui Chou, Hsinchu (TW); Hsueh-Ying Huang, Hsinchu (TW); Chen-Hsien Liao, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 213 days.

(21) Appl. No.: 12/046,468

(22) Filed: Mar. 12, 2008

(65) Prior Publication Data
US 2009/0147184 A1 Jun. 11, 2009

(30) Foreign Application Priority Data
Dec. 6, 2007 (TW) ............................... 96146573 A

(51) Int. Cl.
G02F 1/1335 (2006.01)

(52) U.S. Cl. ........................... 349/65; 349/106; 349/70; 362/612; 362/614

(58) Field of Classification Search ................... 349/68, 349/70, 71, 106, 65; 362/611–614, 555
See application file for complete search history.

(56) References Cited

U.S. PATENT DOCUMENTS

| 6,407,782 | B1 * | 6/2002 | Kim ............................ 349/106 |
| 7,006,172 | B2 * | 2/2006 | Kawana et al. ................ 349/71 |
| 2006/0132679 | A1 | 6/2006 | Sui et al. |
| 2008/0079873 | A1 * | 4/2008 | Utsumi et al. ............... 349/106 |

FOREIGN PATENT DOCUMENTS

CN 1996123 7/2007

* cited by examiner

Primary Examiner—Thoi V Duong
(74) Attorney, Agent, or Firm—Jianq Chyun IP Office

(57) ABSTRACT

A liquid crystal display (LCD) including a backlight module and a liquid crystal display panel is provided. The backlight module has at least one white light source. $BL_1$ and $BL_2$ respectively represent relative maximum brightness peaks of an emission spectrum of the backlight module at a wavelength between 500 nm and 525 nm and between 530 nm and 560 nm, in which $BL_1/BL_2 \geq 0.32$. The liquid crystal display panel is disposed above the backlight module, and has two substrates and a liquid crystal layer sandwiched therebetween. One of the two substrates has a red filter layer, a green filter layer, and a blue filter layer, in which transmittances of the red filter layer and the green filter layer at wavelength of approximately 590 nm are both smaller than about 45%.

10 Claims, 5 Drawing Sheets

LIQUID CRYSTAL DISPLAY

CROSS-REFERENCE TO RELATED APPLICATION

This application claims the priority benefit of Taiwan application serial no. 96146573, filed on Dec. 6, 2007. The entirety the above-mentioned patent application is hereby incorporated by reference herein and made a part of specification.

BACKGROUND OF THE INVENTION

1. Field of the Invention

The present invention generally relates to a display, in particular, to a liquid crystal display (LCD).

2. Description of Related Art

Thanks to the advantages of high definition, desirable space utilization efficiency, low power consumption, and no radiation etc., the LCD has gradually become the main stream of the displays. As the prevailing of the LCD, one of the important indexes to be considered by the consumer when purchasing the LCD is high color reproduction. Recently, in order to meet the consumers' requirements, various LCDs adopting the high color reproduction technique have successively appeared on the market.

The LCD is mainly constituted by a liquid crystal display panel and a backlight module for providing a light source to the liquid crystal display panel, in which the liquid crystal display panel includes, for example, an active device array substrate, a color filter substrate, and a liquid crystal layer sandwiched therebetween, and the color filter substrate has a red filter layer, a green filter layer, and a blue filter layer. Generally, the light source in the backlight module may adopt a cold-cathode fluorescent lamp (CCFL), a light emitting diode (LED), or other types of light sources. Taking the CCFL as a white light source in the backlight module for example, currently, the color saturation NTSC ratio of the LCD substantially reaches a level from about 70% to 75%, in which the color saturation NTSC ratio is used to evaluate the color saturation according to the standard issued by the National Television System Committee (NTSC). In addition, for those of ordinary skill in the art, when the red saturation, green saturation, and blue saturation of the LCD are adjusted, the Adobe specification is generally taken as a reference for color adjustment. According to the Adobe specification, in CIE1931 chromaticity coordinate diagram, the red chromaticity coordinates, green chromaticity coordinates, and blue chromaticity coordinates are respectively represented as red specification (Rx, Ry)=(0.640, 0.330), green specification (Gx, Gy)=(0.210, 0.710), and blue specification (Bx, By)=(0.150, 0.060).

In order to improve the color saturation of the LCD, various techniques have successively been proposed, among which one conventional art uses a CCFL together with a red LED in a backlight module to adjust the color saturation. FIG. 1A is a schematic view of CIE1931 chromaticity coordinate diagram of the LCD. Referring to FIG. 1A, the representation of the LCD 10 at green still has a certain distance from the green color coordinates of the Adobe specification. In other words, the green color saturation representation of the LCD 10 is not so desirable, and as a result, the whole color saturation of the LCD 10 is not ideal.

Accordingly, US Patent Publication US20060132679 provides another LCD 20 using CCFL as the backlight module. FIG. 1B is a schematic view of CIE1931 chromaticity coordinates of the conventional LCD. Referring to FIG. 1B, although the representation of the LCD 20 on the green color saturation is better than that of the LCD 10 in FIG. 1, the representation of the LCD 20 on the red color is less desirable, such that the overall color saturation representation of the LCD 20 still requires to be improved.

SUMMARY OF THE INVENTION

Accordingly, the present invention is directed to an LCD capable of improving the color saturation while considering green saturation and red saturation of the LCD.

The present invention provides an LCD, which includes a backlight module and a liquid crystal display panel. The backlight module has at least one white light source. $BL_1$ and $BL_2$ respectively represent relative maximum brightness peaks of an emission spectrum of the backlight module at a wavelength between 500 nm and 525 nm and between 530 nm and 560 nm, in which $BL_1/BL_2 \geqq 0.32$. The liquid crystal display panel is disposed above the backlight module, and has two substrates and a liquid crystal layer sandwiched therebetween. One of two substrates has a red filter layer, a green filter layer, and a blue filter layer, in which the transmittances of the red filter layer and the green filter layer at wavelength of approximately 590 nm are both smaller than about 45%.

According to an embodiment of the present invention, the emission spectrum of the backlight module includes a relative maximum brightness peak $BL_3$ at a wavelength between 615 nm and 665 nm, and the $BL_3$ falls between 0.3 and 0.8.

According to an embodiment of the present invention, the backlight module includes a direct-type backlight module or an edge-type backlight module.

According to an embodiment of the present invention, the white light source includes a white LED.

According to an embodiment of the present invention, the white light source includes a CCFL. In an embodiment, the CCFL has various fluorescent powder materials on an inner wall, and the fluorescent powder material includes red fluorescent powder, green fluorescent powder material, and blue fluorescent powder.

According to an embodiment of the present invention, the substrates include a thin film transistor (TFT) array substrate and a color filter substrate.

According to an embodiment of the present invention, the substrates include a color filter on array (COA) substrate and an opposite substrate having a common electrode.

According to an embodiment of the present invention, the substrates include an array on color filter (AOC) substrate and an opposite substrate having a common electrode.

To sum up, in the LCD of the present invention, through controlling the relative maximum brightness peak distribution of the emission spectrum of the backlight module, and appropriately matching with the spectrum of the corresponding color filter layer, the green saturation and the red saturation of the LCD can be both improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
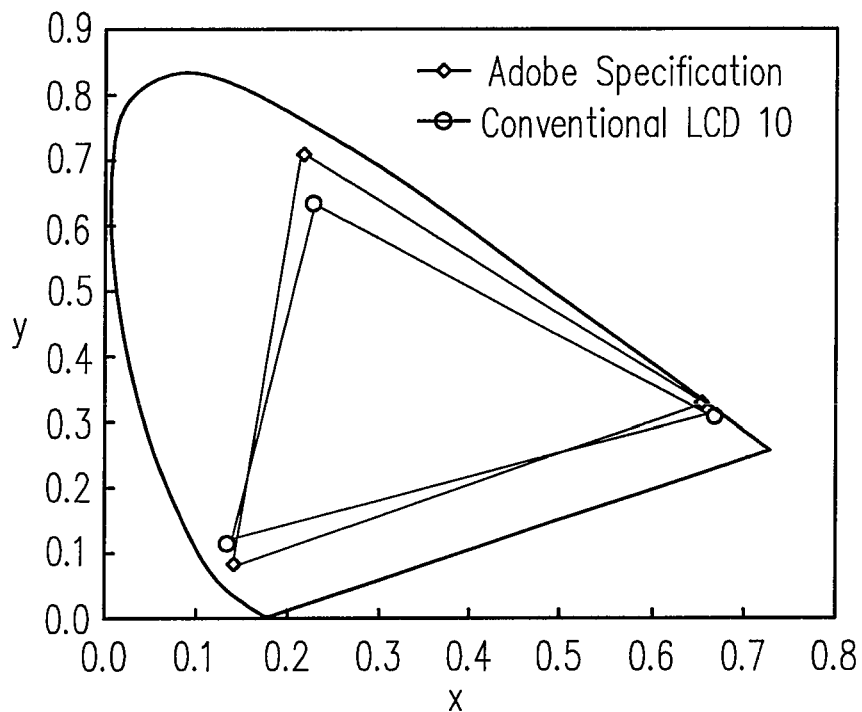
FIG. 1A is a schematic view of chromaticity coordinates of a conventional LCD.
Figure 1B:
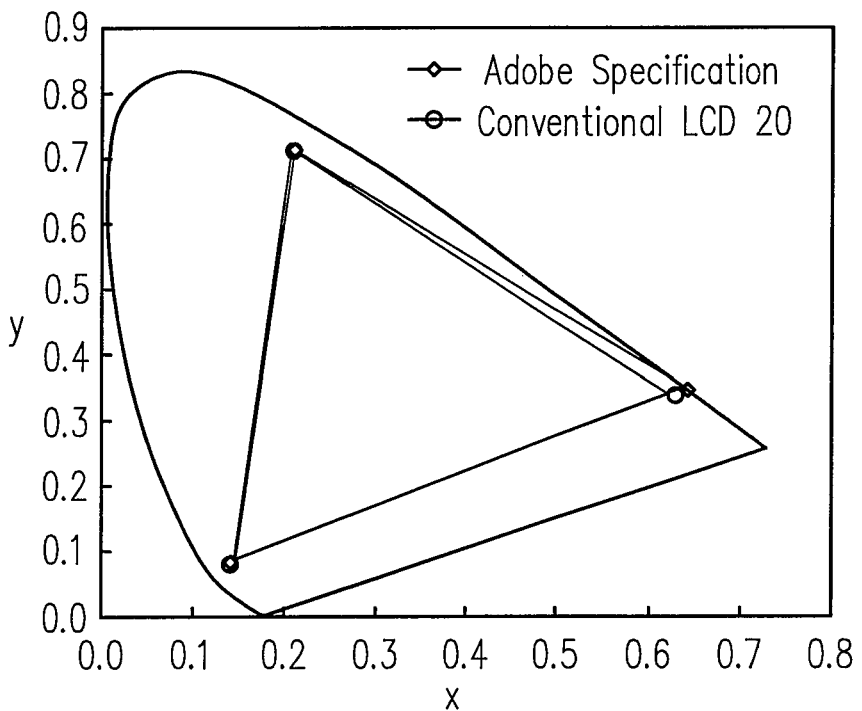
FIG. 1B is a schematic view of chromaticity coordinates of another conventional LCD.

Reference will now be made in detail to the present embodiments of the invention, examples of which are illustrated in the accompanying drawings. Wherever possible, the same reference numbers are used in the drawings and the description to refer to the same or like parts.

Figure 2:
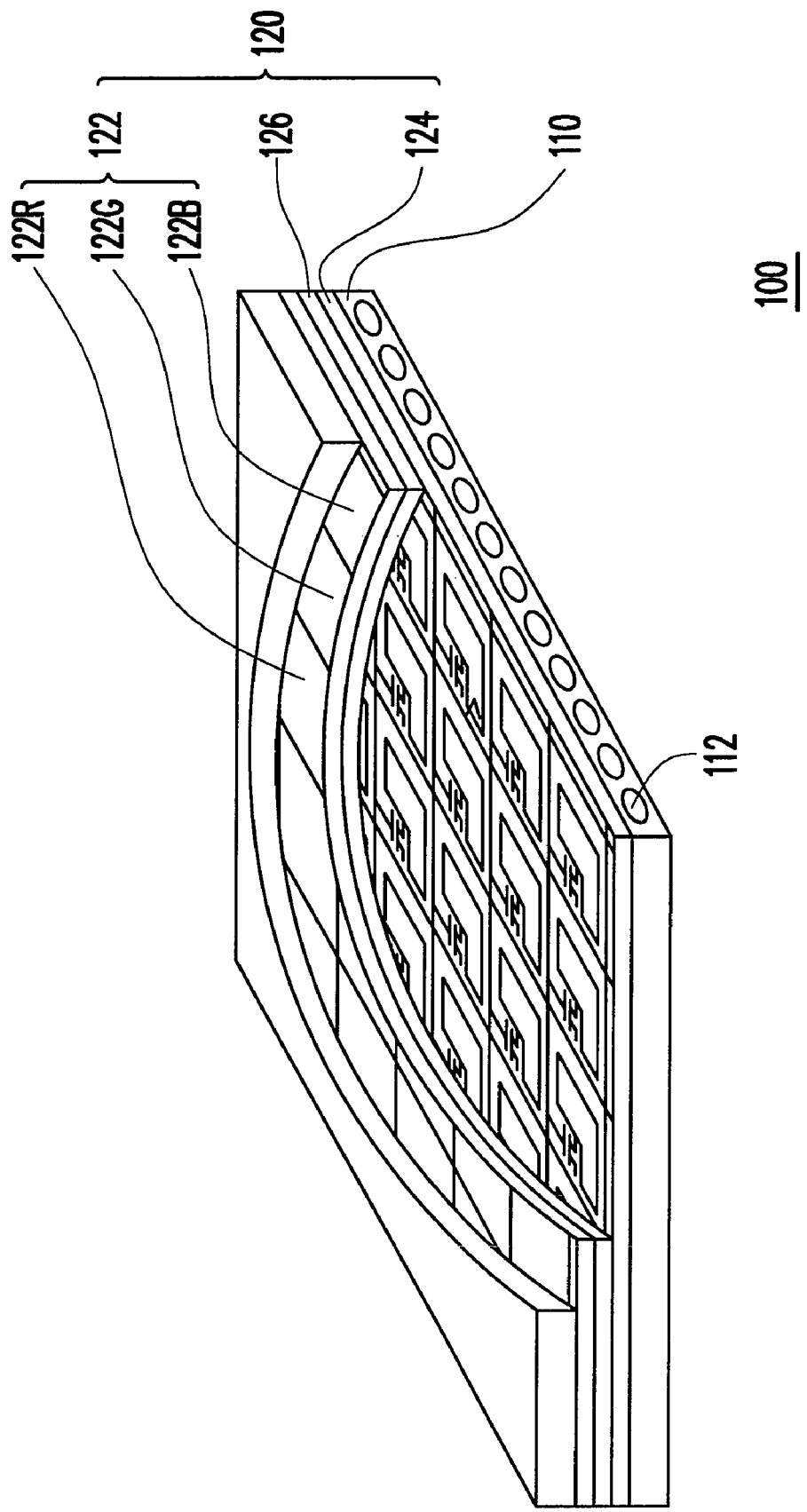
FIG. 2 is a schematic view of an LCD according to the present invention.

FIG. 2 is a schematic view of an LCD according to the present invention. Referring to FIG. 2, an LCD 100 includes a backlight module 110 and a liquid crystal display panel 120, in which the backlight module 110 is, for example, a direct-type backlight module or an edge-type backlight module. The backlight module 110 has at least one white light source 112. In his embodiment, the white light source 112 is, for example, a CCFL. Definitely, in other embodiments, the white light source may also be a white LED, or a combination of a CCFL and an LED, and the present invention is not limited to this.

The liquid crystal display panel 120 is disposed above the backlight module 110, and has two substrates and a liquid crystal layer 126 sandwiched therebetween. As shown in FIG. 2, the two substrates may be a TFT array substrate 124 and a color filter substrate 122 respectively, in which the color filter substrate 122 has a red filter layer 122R, a green filter layer 122G, and a blue filter layer 122B. Definitely, in other embodiments, the two substrates may also be respectively a COA substrate and an opposite substrate having a common electrode, or may be respectively an AOC substrate and an opposite substrate having a common electrode. Particularly, the white light source 112 has various fluorescent powder materials on an inner wall, for example, red fluorescent powder, green fluorescent powder, and blue fluorescent powder, for adjusting the brightness, chromaticity, and other optical properties of the white light source, and the color saturation of the fluorescent powder plays a crucial role in the overall color representation of the LCD. Particularly, the white light source 112 in the LCD 100 adopts a first fluorescent powder and a second fluorescent powder. Through using the first fluorescent powder, the emission spectrum of the backlight module 110 has a relative maximum brightness peak $BL_1$ at the wavelength between 500 nm and 525 nm. On the other hand, through using the second fluorescent powder, the emission spectrum of the backlight module 110 has a relative maximum brightness peak $BL_2$ at the wavelength between 530 nm and 560 nm. The green saturation of the LCD 100 can be adjusted by adjusting the ratio of the relative maximum brightness peak $BL_1$ to the relative maximum brightness peak $BL_2$. In addition, in this embodiment, the emission spectrum of the backlight module 110 has a relative maximum brightness peak $BL_3$ at the wavelength between 615 nm and 665 nm, and the relative maximum brightness peak $BL_3$, for example, falls between 0.3 and 0.8, in which the process for making the emission spectrum of the backlight module 110 have the relative maximum brightness peak $BL_3$ is, for example, to adopt a third fluorescent powder in the white light source 112 in the LCD 100.

Figure 3A:
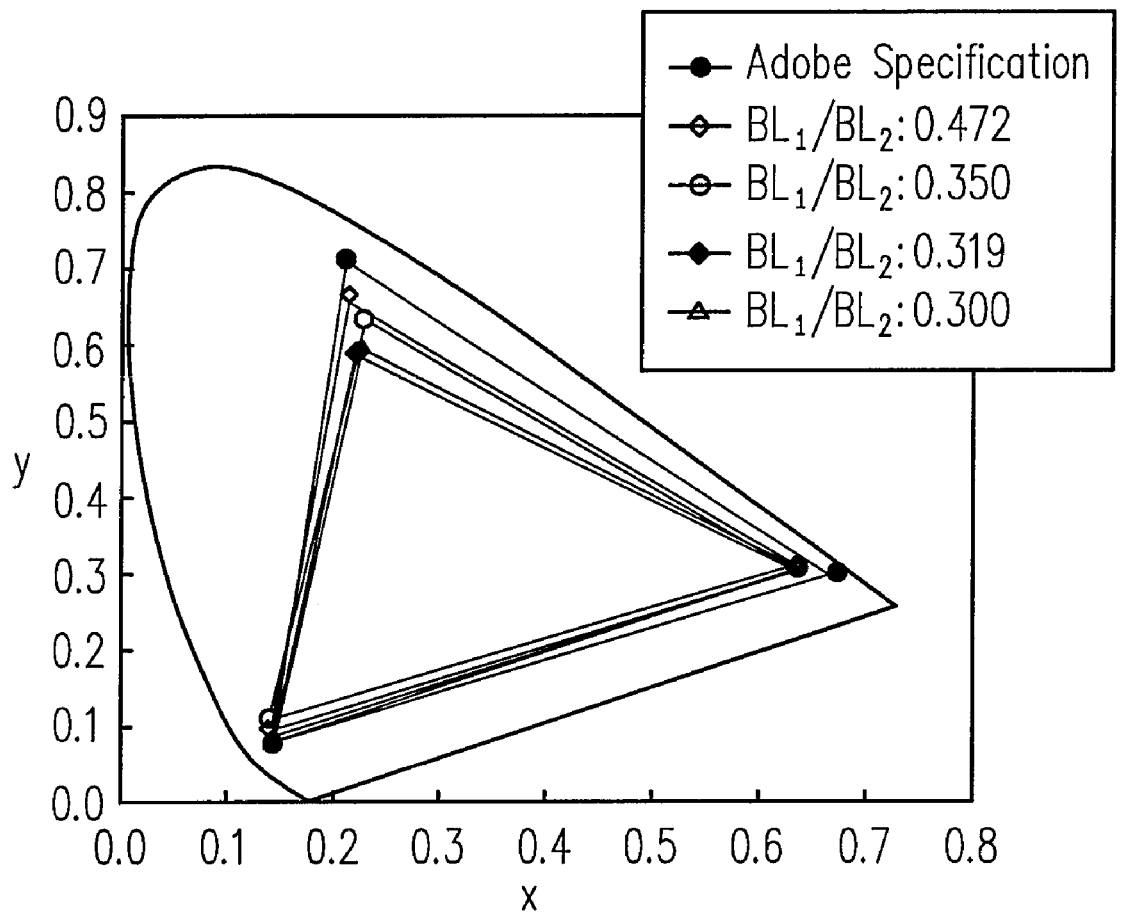
FIG. 3A is a schematic view of a CIE1931 chromaticity of the LCD of the present invention under different ratios of $BL_1$ to $BL_2$.

FIG. 3A is a schematic view of a CIE1931 chromaticity of the LCD of the present invention under different ratios of $BL_1$ to $BL_2$. Referring to FIG. 3A, different ratios of the relative maximum brightness peak $BL_1$ to the relative maximum brightness peak $BL_2$ plays a crucial role for the color representation of the LCD 100 in terms of the green saturation. Especially, when the ratio of the relative maximum brightness peak $BL_1$ to the relative maximum brightness peak $BL_2$ is greater than or equal to 0.32, the green saturation may be effectively improved, and thus improving the overall color saturation of the LCD 100, as shown in FIG. 3A. When the specific relation that the ratio of the relative maximum brightness peak $BL_1$ to the relative maximum brightness peak $BL_2$ is larger than or equal to 0.32 is satisfied, the color saturation NTSC can be effectively improved from substantially 83% to substantially 88%.

Figure 3B:
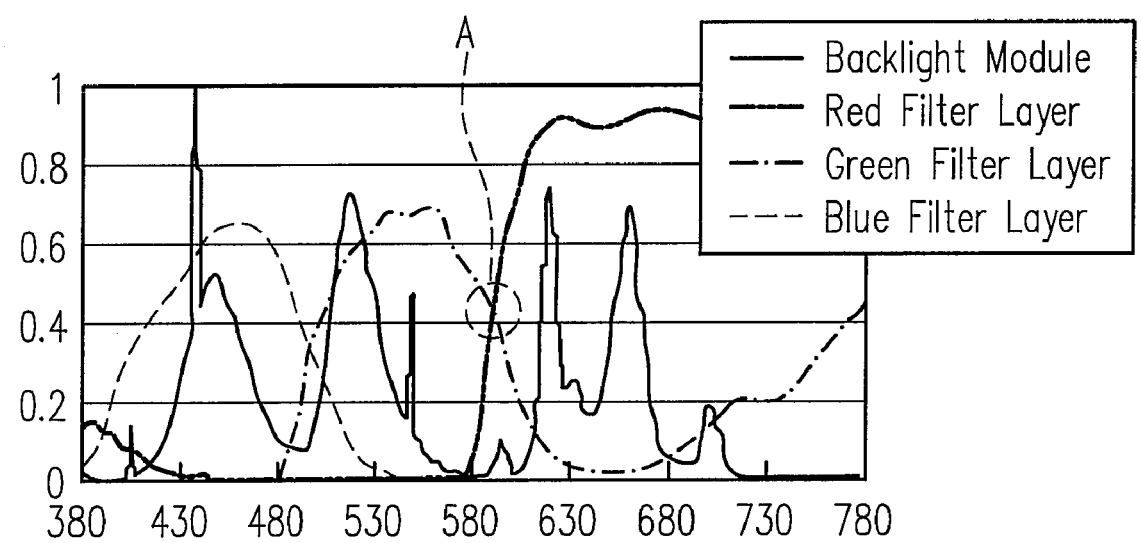
FIG. 3B shows a backlight module emission spectrum of the LCD of the present invention and light transmittance of each corresponding color filter layer.

FIG. 3B shows a backlight module emission spectrum of the LCD of the present invention and light transmittance of each corresponding color filter layer. Referring to FIG. 3B, the transmittances of the red filter layer 122R and the green filter layer 122g at the optical wavelength of approximately 590 nm are both smaller than about 45%, as indicated by Area A in FIG. 3B. In other words, the transmittance of the red filter layer 122R in the present invention at the optical wavelength of approximately 590 nm must be smaller than 45%. As long as the light transmittance at the boundary of the red band after the light beams pass through the red filter layer 122R is smaller than a specific value, the LCD 100 has a better saturation on the red color. Similarly, if the light transmittance at the boundary of the green band after the light beams pass through the red filter layer 122G is smaller than a specific value, the LCD 100 has a better saturation on the green color.

Figure 4A:
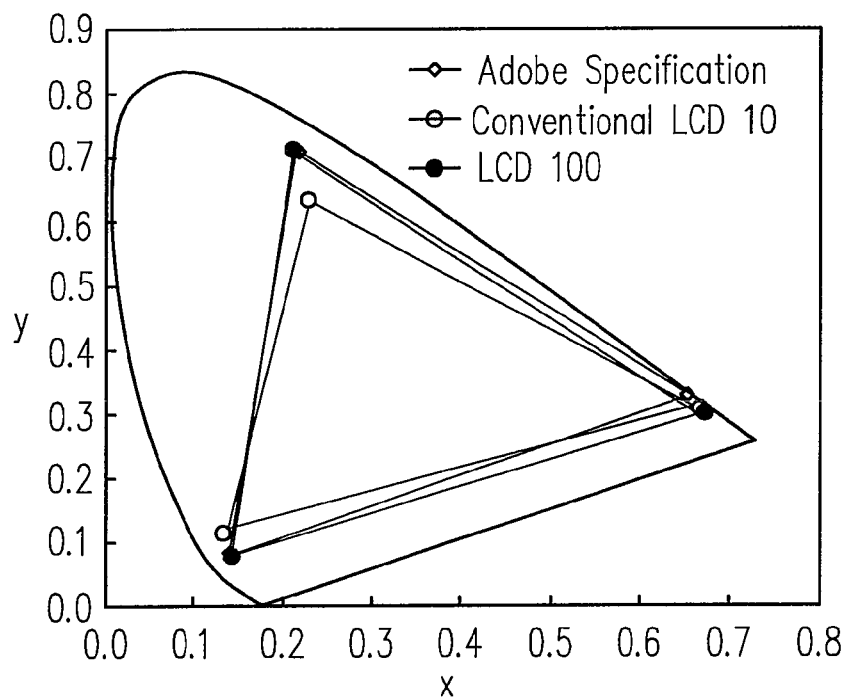
FIG. 4A is a comparison diagram of the CIE1931 chromaticity coordinates of the LCD of the present invention with that of the conventional LCD.
Figure 4B:
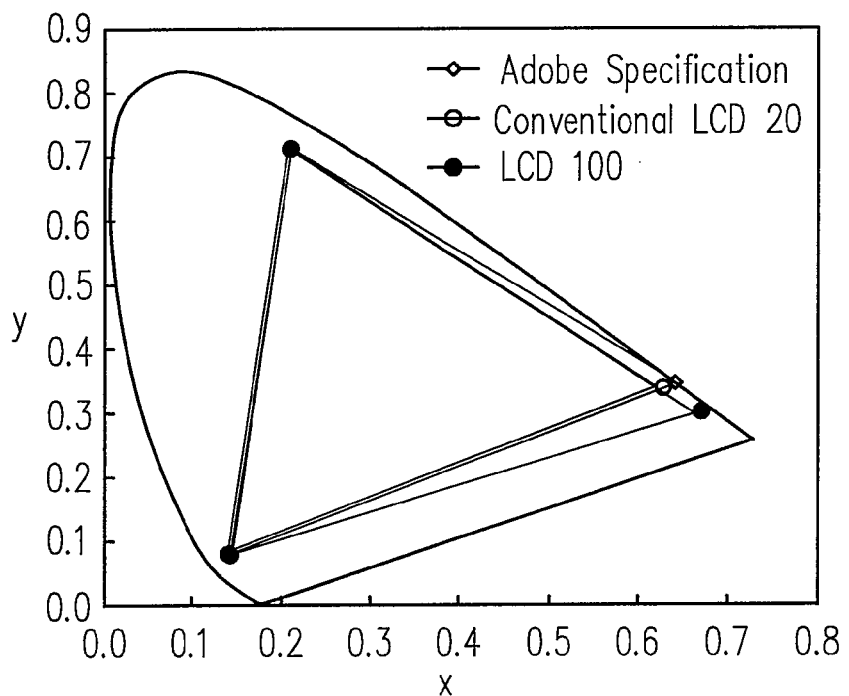
FIG. 4B is a comparison diagram of the CIE1931 chromaticity coordinates of the LCD of the present invention with that of another conventional LCD.

FIGS. 4A and 4B are comparison diagrams of the CIE1931 chromaticity coordinates of the LCD of the present invention with that of the conventional LCD. Firstly, referring to FIG. 4A, there are distinct differences between the conventional LCD 10 and the LCD 100 of this embodiment in the red saturation, the blue saturation, and the green saturation of the chromaticity coordinate diagram. Next, referring to FIG. 4B, there are also distinct differences between the conventional LCD 20 and the LCD 100 of this embodiment on the red saturation of the chromaticity coordinate diagram. Particularly, the backlight module 110 in the LCD 100 has relative maximum brightness peaks $BL_1$ and $BL_2$ of the emission spectrum at the wavelength between 500 nm and 525 nm and the wavelength between 530 nm and 560 nm respectively, and the specific relation of $BL_1/BL_2 \geq 0.32$ is satisfied. Furthermore, the backlight module 110 in the LCD 100 has a relative maximum brightness peak $BL_3$ between 0.3 and 0.8 at the wavelength between 615 nm and 665 nm. On the other hand, the transmittances of the red filter layer 122R and the green filter layer 122G of the liquid crystal display panel 120 at the optical wavelength of approximately 590 nm are both smaller than about 45%.

As shown in FIG. 4A, when the backlight module 110 is matched with the liquid crystal display panel 120 satisfying the above specific relation, the color saturation NTSC of the LCD 100 can be effectively improved, and the LCD 100 has especially excellent representation on green saturation and red saturation. On the other hand, as shown in FIG. 4B, the representation of the LCD 100 on the color saturation NTSC is better than that of the LCD 20, and the LCD 100 has especially excellent representation on the red saturation.

Particularly, as for the green saturation, in the backlight module 110 of the LCD 100 of this embodiment, through controlling the ratio of the relative maximum brightness peak $BL_1$ to the relative maximum brightness peak $BL_2$ to make the relative maximum brightness peak $BL_1$ at least greater than 0.32 times of the relative maximum brightness peak $BL_2$, and then matching with the liquid crystal display panel 120 with the transmittances of the red filter layer 122R and the green filter layer 122G at the optical wavelength of approximately 590 nm being both smaller than about 45%, the LCD 100 has better representation on the green saturation than that of the conventional LCD 10. For example, the process for controlling the ratio of the relative maximum brightness peak $BL_1$ to the relative maximum brightness peak $BL_2$ in the emission spectrum of the backlight module 110 can be achieved by adjusting the blending ratio of the first fluorescent powder to the second fluorescent powder added into the CCFL.

On the other hand, as for the red saturation, in the backlight module 110 of the LCD 100 of this embodiment, besides controlling the distribution of the emission spectrum of the backlight module 110 in the green band, the distribution of the emission spectrum of the backlight module 110 in the red band is also involved for the overall consideration. For example, the emission spectrum of the backlight module 110 in the red band may have a relative maximum brightness peak $BL_3$ at the wavelength between 615 nm and 665 nm, and the relative maximum brightness peak $BL_3$, for example, falls between 0.3 and 0.8, such that the LCD 100 has a better representation on the red saturation than that of the conventional LCD 20. Definitely, the color representations of the red filter layer 122R and the green filter layer 122G corresponding to the backlight module 110 must also satisfy the above specific relation, for example, the transmittances of the red filter layer 122R and the green filter layer 122G at the optical wavelength of approximately 590 nm are both smaller than about 45%, such that the adjustment of the color saturation NTSC of the LCD 100 is more accurate and excellent.

To sum up, when the overall color saturation of the LCD is adjusted, the distribution of the emission spectrum of the backlight module and the color representation of the corresponding red filter layer and green filter layer must be considered together, so as to respectively improve the color saturation of each color, to ensure that color saturation of each color not to interfere with each other, and thus effectively improving the overall color saturation of the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD), comprising:
   a backlight module having at least one white light source, wherein $BL_1$ and $BL_2$ respectively represent relative maximum brightness peaks of an emission spectrum of the backlight module at a wavelength between 500 nm and 525 nm and between 530 nm and 560 nm, and $BL_1/BL_2 \geq 0.32$; and
   a liquid crystal display panel disposed above the backlight module and having two substrates and a liquid crystal layer sandwiched therebetween, wherein one of the substrates has a red filter layer, a green filter layer, and a blue filter layer, and transmittances of the red filter layer and the green filter layer at wavelength of approximately 590 nm are both smaller than about 45%.

2. The LCD according to claim 1, wherein the emission spectrum of the backlight module further comprises a relative maximum brightness peak $BL_3$ at a wavelength between 615 nm and 665 nm, and the $BL_3$ falls between 0.3 and 0.8.

3. The LCD according to claim 1, wherein the backlight module comprises a direct-type backlight module or an edge-type backlight module.

4. The LCD according to claim 1, wherein the white light source comprises a white light emitting diode (LED).

5. The LCD according to claim 1, wherein the white light source comprises cold-cathode fluorescent lamp (CCFL).

6. The LCD according to claim 5, wherein the CCFL has various fluorescent powder materials on an inner wall.

7. The LCD according to claim 6, wherein the fluorescent powder materials comprise red fluorescent powder, green fluorescent powder, and blue fluorescent powder.

8. The LCD according to claim 1, wherein the two substrates respectively comprise a thin film transistor (TFT) array substrate and a color filter substrate.

9. The LCD according to claim 1, wherein the two substrates respectively comprise a color filter on array (COA) substrate and an opposite substrate having a common electrode.

10. The LCD according to claim 1, wherein the two substrates respectively comprise an array on color filter (AOC) substrate and an opposite substrate having a common electrode.

* * * * *